United States Patent [19]
Bolton et al.

[11] Patent Number: 5,294,916
[45] Date of Patent: Mar. 15, 1994

[54] WATER TREATMENT CONTROLLER FOR AN EVAPORATIVE CONDENSER

[75] Inventors: Michael P. Bolton, Fox Point; James A. Rodrian, Grafton; Donald R. Janke, Milwaukee, all of Wis.

[73] Assignee: Autotrol Corp., Milwaukee, Wis.

[21] Appl. No.: 824,636

[22] Filed: Jan. 23, 1992

[51] Int. Cl.⁵ ............................................. G08B 21/00
[52] U.S. Cl. .................................... 340/606; 340/603; 210/696; 261/DIG. 11; 137/392
[58] Field of Search .............. 340/603, 606, 612, 618, 340/620; 210/696, 699; 261/151, DIG. 11; 62/310; 137/551, 391, 392, 5

[56] References Cited

U.S. PATENT DOCUMENTS 4,797,666  1/1989  Baxter et al. ...................... 340/606
5,145,585  9/1992  Coke ........................... 261/DIG. 11

OTHER PUBLICATIONS

Brochure for the Lakewood Instruments Model 170 Series Timer/Conductivity Control.
Lakewood Instruments brochure for the Model 63, 63-DT-A Biocide Timer.
Brochure for the Model 65 Clock Timer from Lakewood Instruments.
Brochure for the Model 1400 Microprocessor Controlled Chemical Feed System by Lakewood Instruments.
Specification of the System T-4-A from Morr Control, Inc.
Brochure describing the Morr Control System H cooling tower controller.
The Morr Control System Z brochure, Sep. 1986.

Primary Examiner—Jeff Hofsass
Attorney, Agent, or Firm—Quarles & Brady

[57] ABSTRACT

An apparatus controls the treatment of water that flows through a cooling system. The electrical conductivity of the water is sensed. A valve control opens a system drain valve when the sensed conductivity is greater than a threshold, and closes the drain valve when the conductivity drops below the threshold by a given amount. The water drained form the system is replenished through an inlet and a mechanism measures the volume of water added to the cooling system. Chemicals to treat the water are fed into the system when specified volumes of water have been added. The sensing of conductivity can be inhibited for a certain period following the application of the chemicals. A possible system malfunction is indicated when the conductivity does not drop below the threshold after the drain valve is open for a given period of time.

14 Claims, 7 Drawing Sheets

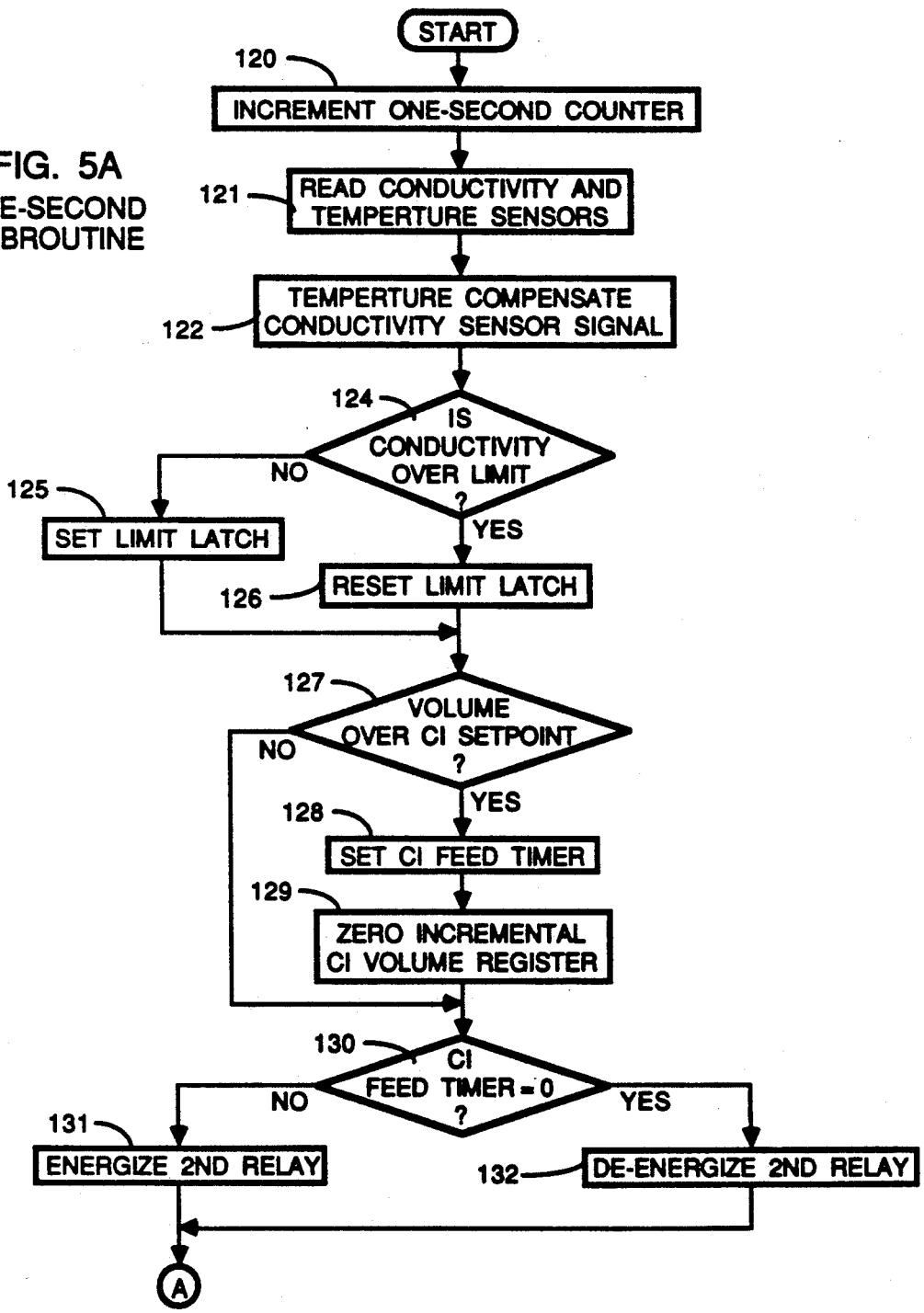

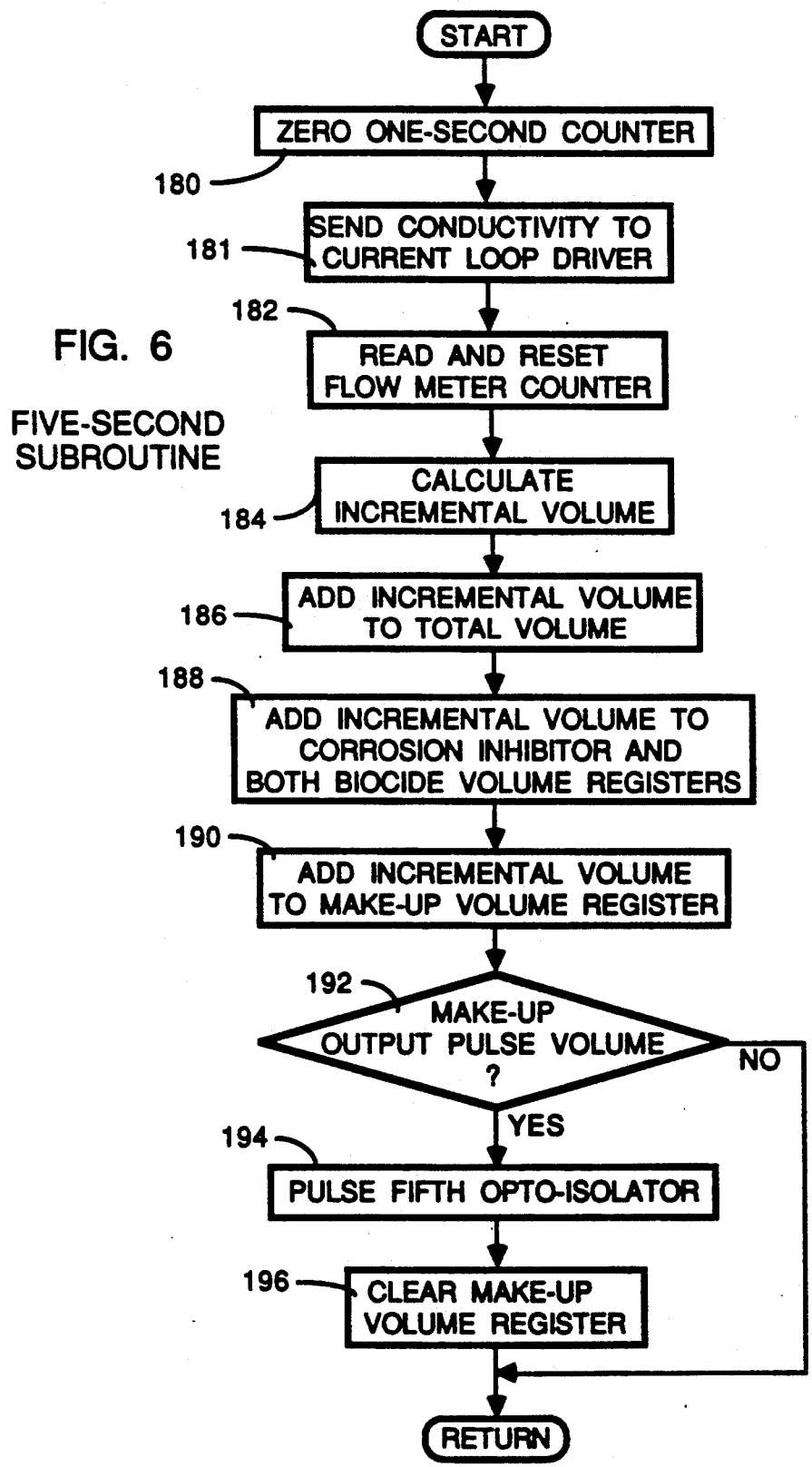

WATER TREATMENT CONTROLLER FOR AN EVAPORATIVE CONDENSER

BACKGROUND OF THE INVENTION

The present invention relates to evaporative condensers for use in cooling systems; and more particularly to apparatus for controlling the treatment of water used in such condensers.

Large cooling systems, such as those found in commercial and industrial buildings, have an exterior evaporative condenser to remove heat from the building interior or from an industrial process. These evaporative condensers are commonly called "cooling towers." A pump circulates water from a reservoir at the base of the cooling tower through a shell or tube heat exchanger where the water picks up waste heat from a refrigeration system or industrial process. The water flows back to the cooling tower where it is sprayed into a stream of air that is drawn or forced through the cooling tower, thereby promoting evaporation of the water which removes heat from the system. Some of the water evaporates before it reaches the reservoir at the bottom of the cooling tower. When the water level in the reservoir drops below a given point, a level activated valve opens which introduces water from a supply to replace, or make-up for, the water which has evaporated.

As the water evaporates over the course of time, the concentration of minerals and other dissolved solids in the circulating water increases. Periodically, an outlet valve of the reservoir is opened to drain some of the water which has a high concentration of total dissolved solids. This water is replenished by water from the supply causing the concentration of dissolved solids in the cooling tower water to diminish. The draining process is commonly called a "bleed-off". Conventional systems for automatically controlling the bleed-off measure the electrical conductivity of the water and open the drain valve when the conductivity exceeds a threshold level which corresponds to an undesirably high concentration of total dissolved solids. Standard conductivity sensors become fouled with minerals over time which diminishes the accuracy of the sensor. Therefore, the sensors periodically must be tested and cleaned when their accuracy falls outside a tolerance range.

Because the cooling tower is open to the atmosphere, algae, bacteria and other organisms can exist and multiply within the reservoir. In response to a programmable time clock, biocides were added to the reservoir water to eliminate these organisms. The concentration of biocides diminishes as the water is drained from the reservoir and new water is added, thereby requiring periodic addition of more biocide.

The internal components of the cooling system may corrode over time depending upon the acidity of the water from the supply. To counter this effect, a corrosion inhibitor also is added to the cooling tower water and must be replenished in order to maintain the proper concentration as water is bled from the system. Previous systems for treating the cooling system water added corrosion inhibitor whenever the bleed-off control discharged water from the system. However, such conductivity based systems can apply more chemical than is required to adequately treat the water.

It is therefore desirable to provide an automatic control system for bleeding off the cooling tower when the concentration of total dissolved solids becomes excessive. The control system also should add the biocides and corrosion inhibitors as needed. However, in order to reduce operating expenses,, the addition of chemicals must be regulated so that only the amounts necessary for satisfactory operation are added to the cooling tower. It is also desirable that the accuracy of the system be periodically checked and an indication given to the operator when maintenance is required, such as cleaning the conductivity sensor.

SUMMARY OF THE INVENTION

A water circulation system has a drain valve and a mechanism for replenishing water consumed by or drained from the system. The concentration of dissolved solids in the water increases with time. Chemicals have to be added periodically to the water, especially to treat new water that is added to the system.

A controller for the system senses the electrical conductivity of water as an indicator of the concentration of dissolved solids. The drain valve is opened by the controller when the sensed conductivity is greater than a defined threshold level. As water is drained from the system, new water is added thereby reducing the concentration of dissolved solids and the water conductivity. When the conductivity has reduced to a satisfactory level, the controller closes the drain valve.

The controller also has a mechanism which measures the volume of water that is added to the system. Each of several chemicals are added to the water whenever a separately defined amount of water has been added since the last application of that chemical. Certain chemicals, particularly biocides, affect the conductivity of the water which could be erroneously interpreted as an excessively high concentration of dissolved solids by the controller. To prevent such an erroneous interpretation from causing the drain valve to be opened, the operation of the valve is inhibited for given period of time following the application of that chemical.

The preferred embodiment of the controller includes an apparatus that measures the amount of time between when the conductivity exceeds the defined threshold level and when the conductivity drops to a satisfactory level. If the time exceeds a predetermined interval, a signal is produced indicating that the means which senses conductivity may be malfunctioning. This indicates to the user that the conductivity sensor or other system component requires maintenance.

BRIEF DESCRIPTION OF THE DRAWINGS

FIGS. 5A-5C are a flowchart of a subroutine that is called by the program in FIG. 4 at one-second intervals; and FIG. 6 is a flowchart of a subroutine that is called by the program in FIG. 4 at five-second intervals.

DETAILED DESCRIPTION OF THE INVENTION

Figure 1:
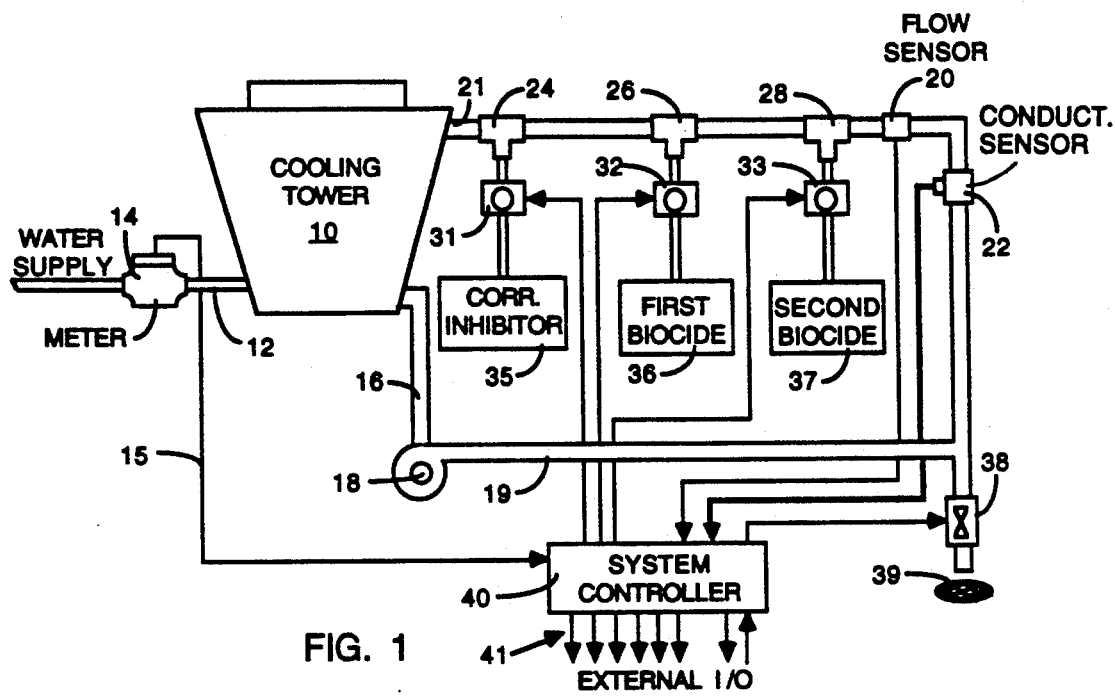
FIG. 1 is a diagram of a water circulation system for a cooling tower.

With initial reference to FIG. 1, a cooling tower 10 has a water inlet 12 connected to a water supply by a conventional flow meter 14. The flow meter emits a pulsed signal on line 15 which has a frequency that corresponds to the rate at which water is flowing from the water supply into the cooling tower. Inlet 12 is connected to a conventional float or level sensing valve which is opened whenever the water within a reservoir at the bottom of the cooling tower drops below a given level.

A water outlet 16 from the cooling tower reservoir is connected to a circulating pump 18 which is controlled by an external system. Typically the circulating pump runs continuously whenever cooling is required. For example, pump 18 can be operated by the air conditioning system for a building when the cooling tower is part of that system. The outlet 19 of the pump 18 is connected through a series of pipes into a return inlet 21 at the top of the cooling tower 10. A flow sensor 20 closes an electrical switch in response to water flowing between the pump outlet 19 and tower return inlet 21.

Several other components are mounted in line between the circulating pump 18 and the cooling tower return inlet 21. One of these is a conductivity sensor 22 which measures the electrical conductivity of the water flowing through the pipes and produces an analog electrical signal representative of the conductivity. As is well known, the conductivity of fluids is highly temperature dependent. The conductivity sensor 22 includes an integral temperature measuring device, such as thermistor, that provides an analog signal indicative of the sensor's temperature. Alternatively, the conductivity sensor 22 may be placed in a side stream branch connected between the pump outlet 19 and the water outlet 16 from the cooling tower reservoir. Such an alternative location may be more convenient and allow the use of smaller diameter pipe in which to mount the sensor 22.

Three T fittings 24, 26 and 28, or corporation stops, connect outputs of three pumps 31, 32 and 33, respectively, to the return inlet 21 of the cooling tower 10. Each of these electrically operated pumps 31, 32 and 33 forces fluids from three tanks 35, 36 and 37, respectively, into the cooling tower. The first tank 35 contains a corrosion inhibitor, the second tank 36 holds one type of biocide and the third tank 37 contains another type of biocide. Each of the pumps 31-33 is individually controllable to independently introduce the chemical from its associated tank 35-37 into the water flowing into the cooling tower through return inlet 21.

The outlet of the circulating pump 18 also is connected to an electrically operated valve 38 which when opened sends water from the pump outlet 19 to a waste drain 39. The opening of valve 38 bleeds-off cooling tower water.

The make-up water meter 14, flow and conductivity sensors 20 and 22, chemical pumps 31-33, and drain valve 38 are connected to a system controller 40. As will be described in detail, the system controller employs the electrical conductivity measurement provided by sensor 22 to determine when to open valve 38 to bleed-off the system. Further, the system controller 40 calculates the volume of water being added to the cooling tower 10 based on the signal from flow meter 14 and determines when and how much of each of the chemicals in tanks 35, 36 and 37 to add to the cooling tower water.

SYSTEM CONTROLLER

Figure 2:
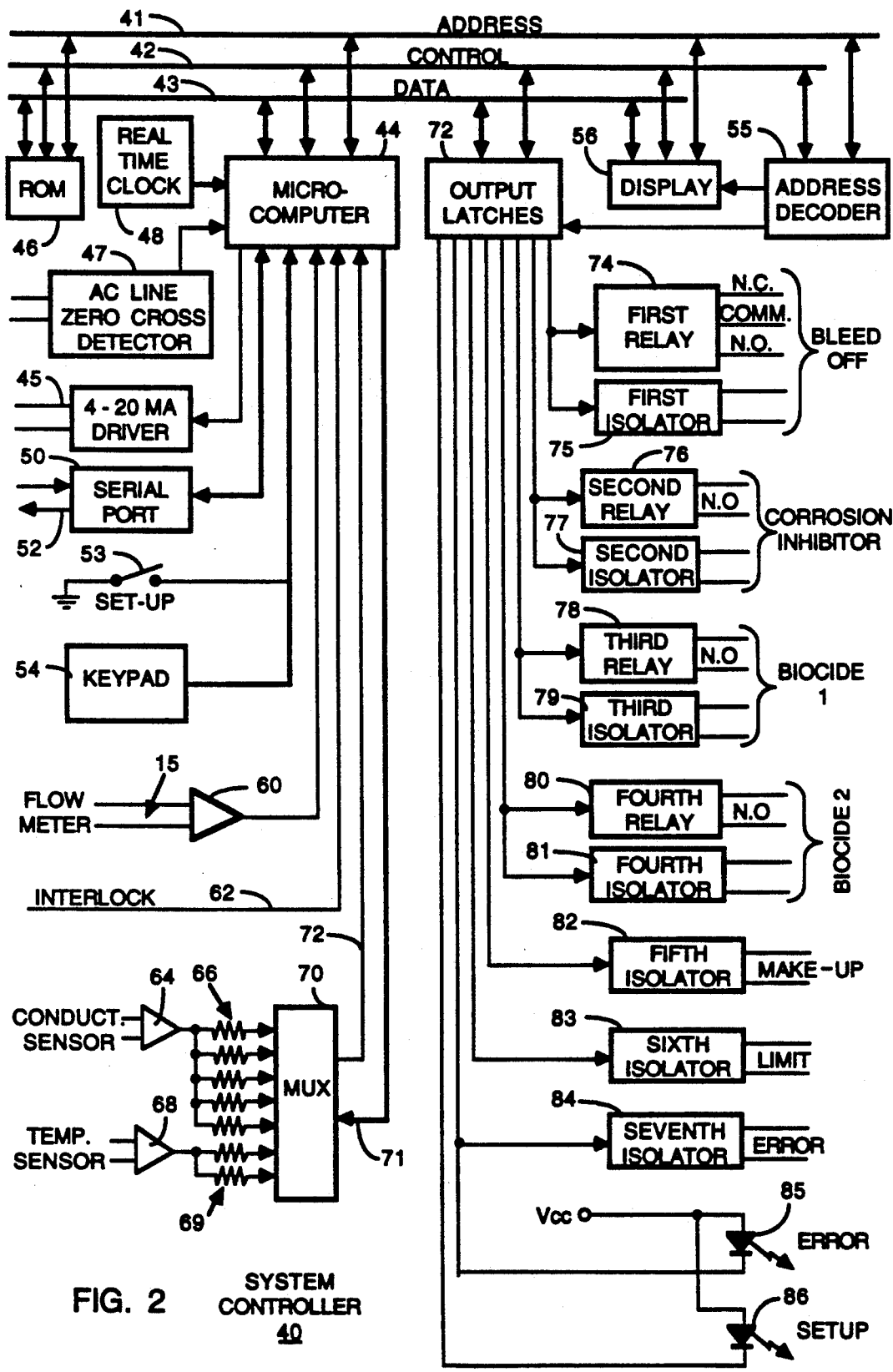
FIG. 2 is a schematic diagram of the circuitry for the controller shown in FIG. 1.

With reference to FIG. 2, the system controller 40 is based around a microcomputer 44 which is connected to a set of parallel address and data buses 41 and 42. A set of control lines from the microcomputer form a bus 43. The microcomputer 44 may be a model MC68HCP11A1FN manufactured by Motorola, Inc. This type of microcomputer includes several digital input/output ports, an analog input port, counters and an internal random access memory. The control program which is executed by microcomputer 44 is stored in a read only memory 46.

At power up, the microcomputer receives time and date information from a battery powered real time clock 48 which information is stored in storage locations of the internal memory of the microcomputer. Thereafter, the stored time and date information is periodically updated based on the AC line frequency. For this purpose a zero crossing detector 47 interrupts the microcomputer 44 every time the voltage of the AC supply line 45 makes a zero crossing. This causes the microcomputer to increment a count of the zero crossings. Every time 120 zero crossings of the 60 Hz. supply voltage are counted, the time in the microcomputer memory is incremented by one second and the zero crossing counter is reset.

One output of the microcomputer 44 is connected to a 4-20 milliampere current loop driver 50 which produces an analog current loop output indicative of the cooling tower water conductivity. The microcomputer also is connected to a serial port circuit 52 to provide bidirectional digital communication to an external device, such as a host computer. A keypad 54 allows an operator to enter commands into the microcomputer 44 and a display 56, which is connected to bus 41-43, enables the microcomputer to present alphanumeric and other information to the operator.

The different water sensor signals also are fed to the microcomputer 44. Specifically, line 15 from the flow meter 14 connects to a buffer amplifier 60 which sends a pulsed signal to a digital input of the microcomputer 44. This input is connected to an internal counter of the microcomputer which counts the pulses of the flow meter signal. The flow sensor 20. is connected to an interlock input line 62 of the microcomputer. An inactive signal on the interlock input line 62 causes the controller to shut down, as will be described. The analog signal from the conductivity sensor 22 is connected to an current to voltage amplifier 64. The output of the amplifier 64 is coupled through a set of resistors 66, each having a different value, to separate inputs of an analog multiplexer 70. The signal from the temperature sensor in device 22 is connected to another amplifier 68 in the controller 40, the output of which is coupled by a pair of different value resistors 69 to additional inputs of the analog multiplexer 70. The microcomputer 44 sends control signals over lines 71 that cause the multiplexer 70 to select one of the inputs to connect to an analog input line 72. The analog input line 72 is connected to an internal analog to digital converter within the microcomputer.

The microcomputer 44 generates signals for operating the chemical pumps 31-33 and other devices via a group of output latches 72. Data bits sent over the data bus 43 are stored in the latches 72 upon the receipt of an enable signal from an address decoder 55. The address decoder 55 responds to specific addresses on bus 41 and control signals on bus 43 from the microcomputer by producing control signals which enable the output latches 72 and display 56.

There are eight latches in group 72, each producing a different output control signal. One latch is connected to the coil of a first relay 74 that has normally closed (N.C.) and normally open (N.O.) contacts. This latch also is connected to a first opto-isolator 75 which closes a conductive path between two output lines when the latch is set with a high logic level data bit. The first relay 74 and the first opto-isolator 75 are activated during a bleed-off operation. The contacts of the first relay 74 apply power to drain valve 38.

Another one of the output latches 72 is connected to the coil of a second relay 76 which has normally open contacts. The contacts of the second relay are connected to apply electricity to the first chemical pump 31 which introduces the corrosion inhibitor from tank 35 into the cooling tower 10. An indication of when corrosion inhibitor is being added is provided by an output signal from a second opto-isolator 77. Another pair of output latches 72 are connected to the third and fourth relays 78 and 80 to close their normally open contacts which respectively apply power to the two biocide pumps 32 and 33. Third and fourth opto-isolators 79 and 81 provide digital signals indicating when the first and second biocides are being added to the cooling tower water.

Yet another one of the output latches 72 is connected to a fifth opto-isolator 82 to produce an output signal that indicates when make-up water is being added from the water supply to the cooling tower via inlet 12. Another latch in group 72 is connected to the sixth opto-isolator 83 to produce a signal when the electrical conductivity of the cooling tower water is greater than a defined threshold. A seventh opto-isolator 84 and a light emitting diode 85 are connected to the output of a further latch 72 to provide indications of when an error condition exists. Another light emitting diode 86 is connected to the final output latch in group 72 and provides a visual indication when the system controller 40 is in the set-up mode, as will be described.

SYSTEM OPERATION

When the controller 40 is first installed on the cooling tower 10, the user must set-up the system by configuring the different functions which the controller performs. For example, the user must specify when and how much of each chemical contained in tanks 35-37 is to be introduced into the cooling tower. The user also sets the electrical conductivity threshold at which a bleed-off occurs.

The set-up procedure is similar to those used to configure other types of programmable devices. The user momentarily closes switch 53 which signals the microcomputer 44 that the controller is to be placed in the set-up mode. In this mode, the user presses keys on keypad 54 to step through the configuration process. At each step during the set-up, the display 56 presents an inquiry asking the user to select among several options or to specify a value for a given parameter. The user is allowed to step backwards and forwards through the procedure by appropriate activation of arrow keys on keypad 54. At the completion of the set-up process again the user momentarily closes switch 53 to signal that the configuration is complete.

Figure 3:
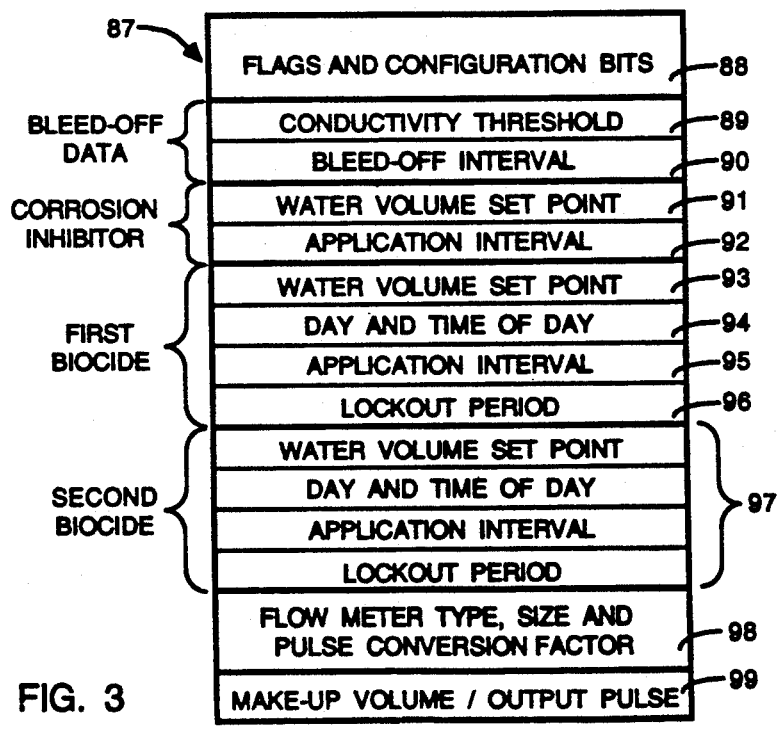
FIG. 3 depicts data structure of information stored in the controller to define its operation.

The configuration data entered during the set-up mode is stored in a table 87 within the internal non-volatile memory (e.g. an EEPROM) in the microcomputer 44 as depicted in FIG. 3. The data table 87 consists of a number of sections, such as section 88 which contains flags and configuration bits that indicate control process options that are enabled. The conductivity threshold at which a bleed-off is to occur is stored in data entry 89 and another entry 90 designates the duration of the bleed-off interval.

The next two entries 91 and 92 contain parameters for controlling the application of the corrosion inhibitor in tank 35. The corrosion inhibitor is added to the cooling tower water when a given volume of water has been added through supply inlet 12 since the last application of that chemical. Date table entry 91 is a numerical designation of the incremental water volume which triggers another application of the corrosion inhibitor. The data entry 92 is a numerical value indicating the interval of time that the first chemical pump 31 is turned on during each application of the corrosion inhibitor. This interval is specified by the user based on the flow rate of the pump 31, so that the proper amount of corrosion inhibitor is applied to the water.

The next section of storage locations within the table 87 of configuration data contains information for the application of the first biocide from tank 36. Both biocides can be applied either each time a given volume of make-up water is added to the cooling tower from the supply or at a specific time during a two week control period. The first entry 93 of biocide configuration data 87 stores the incremental volume of water which causes another application of the biocide, whereas entry 94 indicates the day and time of day during the two week control period at which the application of biocide is to occur. After set-up, only one of these two entries 93 or 94 should contain data as only one option may be enabled. An attempt to activate both of these options causes a conflict which is detected and signalled to the user during the set-up process. Entry 95 in the memory data table stores a designation of the length of time that the second pump 32 is to be turned on to apply the first biocide. As with the corrosion inhibitor, this length of time determines the amount of chemical to be added to the water.

Commonly used biocides increase the conductivity of the water to which they are added and portions of the cooling tower water may be extremely high conductivity following biocide application. As a consequence, conductivity measurement must be suspended for a period of time so that the biocide concentration can equalize throughout the cooling tower water and diminish due to dilution and interaction with the organisms. Entry 96 in the configuration data for the first biocide contains a lockout time period following the application of the biocide during which conductivity measurement and bleed off is inhibited. This user selectable period may be 120 minutes, for example, and is dependent on the characteristics of the particular biocide. By setting the contents of entry 96 to zero the user disables the lockout feature, as may be done when biocide application is determined by water flow volume as will be described. Another section 97 of storage locations in the data table 87 contains similar information for the second biocide.

Configuration data table entry 98 specifies the type of make-up water flow meter 14 which is used in the system. This information indicates the size of the inlet pipe and a conversion factor which specifies how the frequency of the signal on output line 15 corresponds to flow rate. This data allows the controller 40 to determine how much water has entered the cooling tower through inlet 12 by counting the number of pulses produced by the flow meter 14 during a fixed period of time as will be described.

Another section 99 of the data table 87 stores information that defines the amount of "make-up" water that is to flow into the cooling tower before the fifth opto-isolator 82 is pulsed. Thus each pulse of the make-up signal from this opto-isolator 82 indicates that the specified amount of water has been added to the cooling tower.

The configuration data in table 87 is read by the microcomputer 44 during the execution of a control program stored in ROM 46. The main loop of this program is depicted by the flowchart in FIG. 4 and begins at step 100 where the microcomputer initializes the values of variables, counters and registers that are utilized during program execution.

Then at step 102, the interlock input line 62 is read by the microcomputer. This line is coupled to the flow sensor 20 which halts the operation of the controller 40 when the flow ceases. In the embodiment illustrated in FIG. 1 the interlock input line 62 is connected to the flow sensor 20. If this input indicates that water is being pumped through the cooling tower, the program execution jumps to step 108. Otherwise when the water is not flowing, all the outputs of the controller 40 are deactivated at step 103 by storing low logic levels in the data latches 72. This ceases any bleed-off which may be occurring by closing drain valve 38 and terminates the application of the chemicals by shutting off pumps 31-33. A high logic level is sent to set the latch for the seventh opto-isolator 84 to produce an error indication at step 104. The setting of this latch also illuminates the error LED 85.

Then at step 105, the program execution loops, continuously testing the interlock input line 62 to determine whether the flow sensor 20 has detected the resumption of flow through the cooling tower plumbing system. During this looping, it may be desirable to have the microcomputer 44 test whether the set-up mode switch has been activated or whether other events have occurred so that appropriate information can be displayed to the user. Once water flow is detected again, the program execution resumes at step 106, by discontinuing the error indications from the seventh opto-isolator 84 and the LED 85.

Figure 5B:
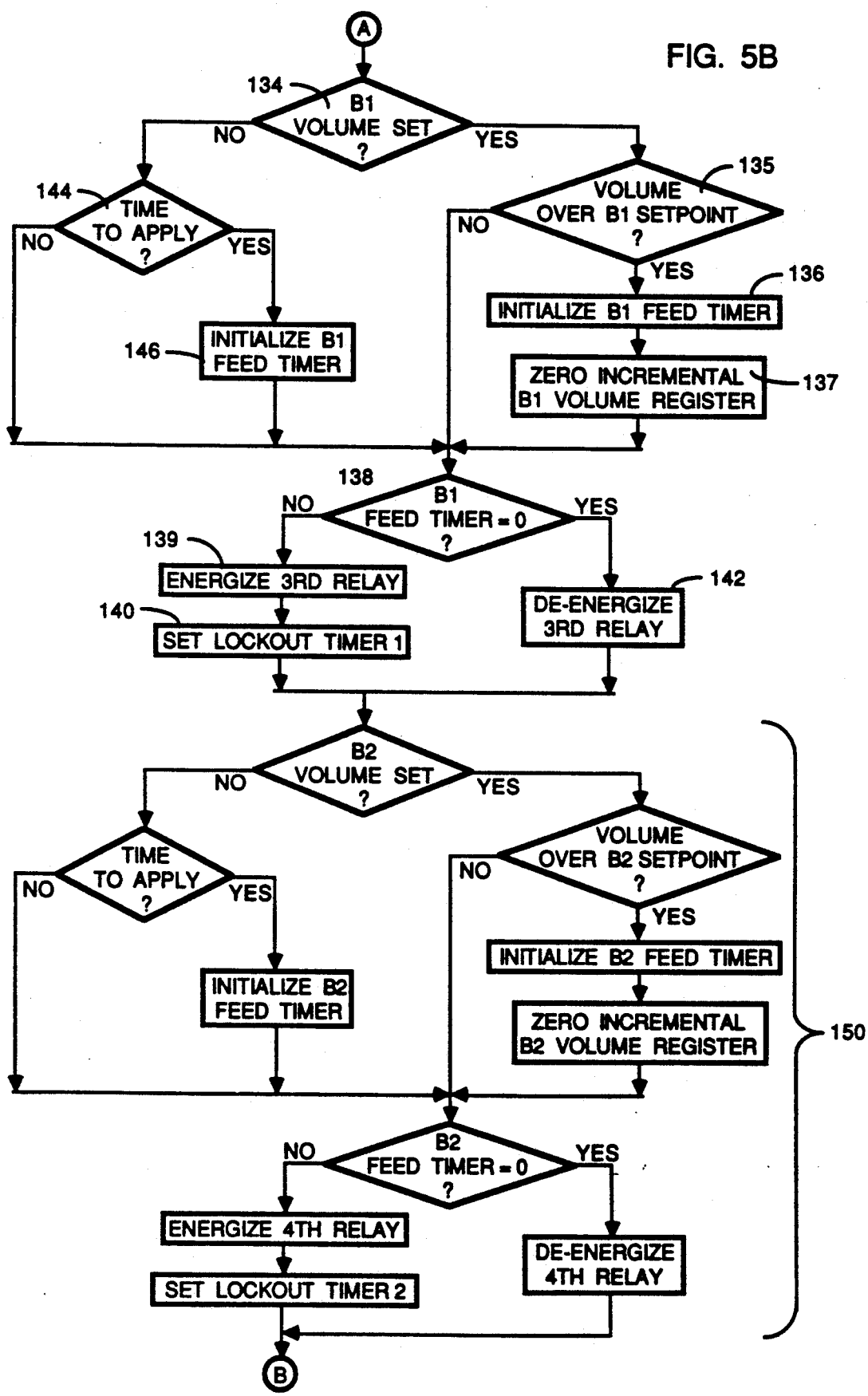
Figure 5C:
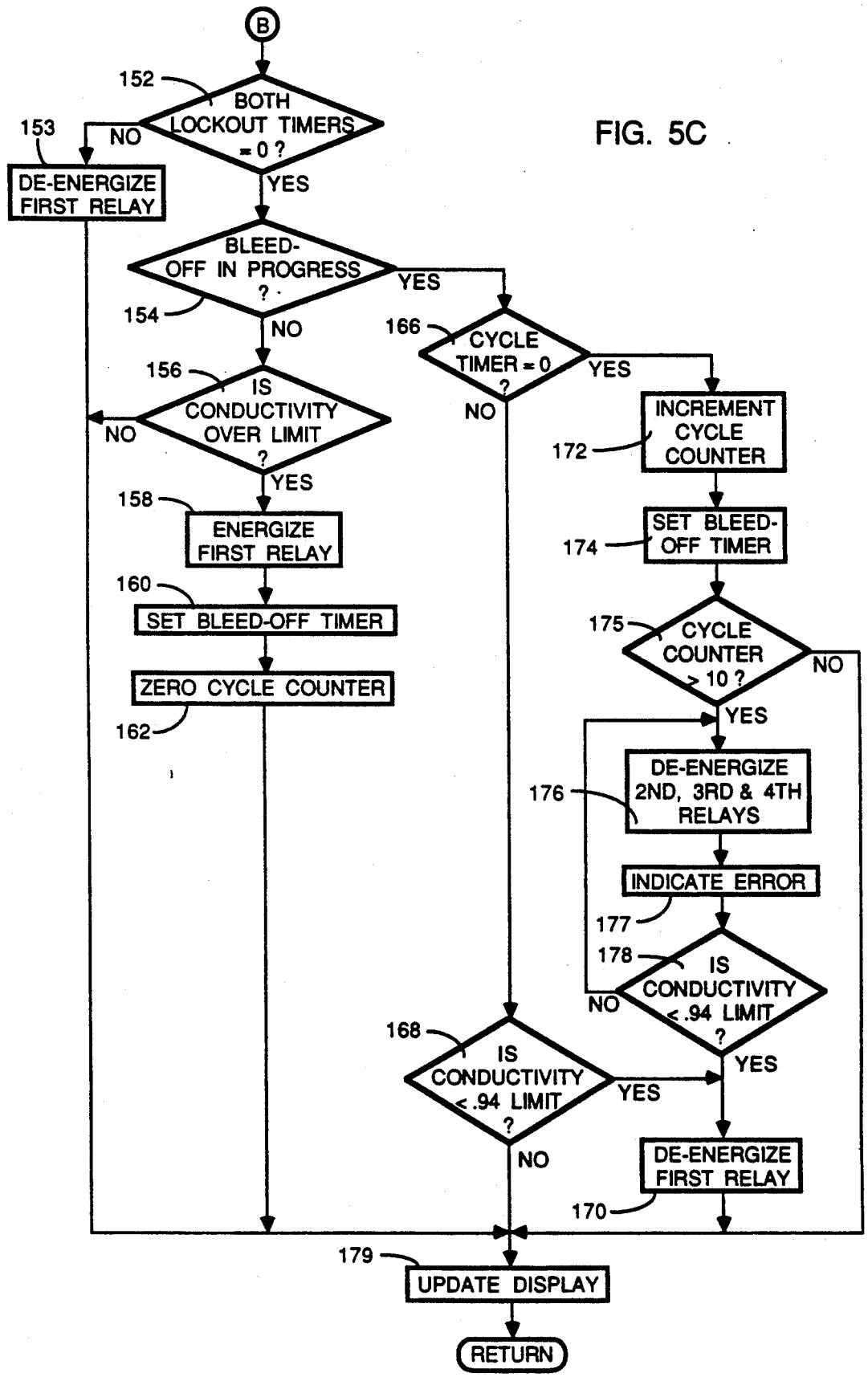

Then at step 108 the time stored in memory is checked to determine if the seconds register in memory has been incremented since the last time that this step was executed. If so, the program execution branches to step 109 where a subroutine depicted in the flowchart in FIGS. 5A-5C is called. This subroutine is executed once every second and commences at step 120 with the microcomputer incrementing a counter which counts the one-second intervals. This count is used subsequently to determine when to call another subroutine that is executed every five seconds. Then at step 121 the microcomputer 44 reads the conductivity and temperature from sensor 22. The reading of both these parameters utilizes an auto-ranging technique in which the microcomputer 44 sends commands to the analog multiplexer 70 in FIG. 2 to sequentially select the different inputs of the multiplexer which are connected to the conductivity sensor amplifier 64. These multiplexer inputs are connected to different valued resistors in set 66 which attenuate the analog signal from the amplifier 64 by different amounts. This enables a wide range of analog signal levels to be interfaced to the analog input of the microcomputer 44. The microcomputer sequentially selects each of the multiplexer inputs until the output from its internal analog to digital converter produces an output value having a satisfactory magnitude for signal resolution. Such auto-ranging techniques are well understood by persons skilled in signal measurement. The microcomputer 44 also knows the attenuation factor of the finally selected input, which enables the value from the sensor to be normalized during later computation of conductivity. A similar technique is used to read the analog temperature signal from other inputs of the multiplexer 70. The values of the conductivity and temperature are stored temporarily in a random access memory (RAM) within the microcomputer 44. At step 122, The newly determined temperature is used to compensate the conductivity reading.

The program execution advances to step 124 where the new conductivity value is compared to the conductivity threshold specified by entry 89 in the configuration data table 87. If the conductivity is over the threshold limit, the microcomputer at step 125 sets the output latch in group 72 to a high logic level which causes the sixth opto-isolator 83 to produce a digital indication that the conductivity limit has been exceeded. Otherwise step 126 is executed to reset the latch for the sixth opto-isolator 83 to a low logic level terminating any previous indication that the limit had been exceeded.

The next portion of the control program regulates the application of the corrosion inhibitor and biocides from tanks 35-37. These chemicals can be introduced into the cooling tower 10 based on the amount of make-up water that is added from the supply via inlet 12. The flow meter 14 produces a pulsed signal on line 15 that has a frequency which is proportional to the flow rate of the water through the inlet 12. This flow meter signal is connected via buffer amplifier 60 to an internal counter of microcomputer 44 which counts pulses of the flow meter signal independent of other operations performed by the microcomputer. As will be described, every five seconds the microcomputer 44 reads the flow meter counter and processes the flow rate data to calculate the volume of water that has been added to the cooling tower 10. The calculated volume is added to the contents of incremental volume registers for each of the three chemicals, referred to as the corrosion inhibitor (CI) volume register, the first biocide (B1) volume register and the second biocide (B2) volume register. The contents of these registers indicate the volume of water that has been added to the cooling tower since the last application of the respective chemical. The time at which to add the chemical is determined based of the contents of these registers.

At step 127, the microcomputer 44 compares the contents of the corrosion inhibitor (CI) volume register to the volume set point in entry 91 of the configuration data table. If the actual volume has not reached the set point, the program execution jumps around steps 128 and 129. Otherwise when the set point is exceeded, an feed timer for the corrosion inhibitor application is initialized within the microcomputer 44 at step 128 with the value from entry 92 of the configuration data table 87. Next at step 129, the incremental volume register for the corrosion inhibitor is reset to zero. Then the corrosion inhibitor feed timer is tested at step 130. If the timer has a non-zero value, the microcomputer sets an output latch in group 72 to a high logic level which energizes the second relay and turn on the corrosion inhibitor pump 31, thereby applying that chemical to the cooling tower water at step 131. Otherwise when the corrosion inhibitor feed timer has expired, the latch is reset with a low logic level to de-energize the second relay and turn off the corrosion inhibitor pump 31 at step 132.

The execution of the one-second subroutine then advances to step 134 on FIG. 5B. As noted previously the biocide application may be triggered either by an incremental amount of make-up water being added to the cooling tower or at a specific time in a two week control period. Thus the microcomputer 44 examines the contents of entry 93 of the configuration data for the first biocide (B1) in table 87. A non-zero value in entry 93 indicates that the volume of make-up water is to be used in determining when to apply the biocide. In that event, the contents of the first biocide volume register in the microcomputer memory are compared to the water volume set point in data table entry 93 at step 135 to detect if the volume has exceeded the set point indicating the need to apply the biocide.

When the first biocide should be applied to the cooling tower water, a separate feed timer for that biocide (B1) is initialized at step 136 with the value of the application interval from data table entry 95. Then the incremental volume register for the first biocide is reset to zero at step 137. The feed timer for the first biocide is checked at step 138. When the timer has a non-zero value the program branches to step 139, where the microcomputer sets an output latch in group 72 to a high logic level to energize the third relay 78. This action powers the second chemical pump 32, thereby introducing the first biocide into the cooling tower water.

The application of conventional biocides raises the conductivity of the cooling tower water until such time as the biocides distribute evenly through the water. As a result measurement of the water conductivity must be inhibited for a period of time following the biocide application. This amount of time is specified by the lockout period for the first biocide from data table entry 96. The contents of this entry are read at step 140 and loaded into the first lockout timer within the microcomputer 44.

When the feed timer for the first biocide is found to have expired at step 138, the third relay 78 is de-energized by resetting the corresponding data latch 72 to a low logic level output at step 142. This action terminates any application of the first biocide that was taking place.

If at step 134, non-zero data is not found in entry 93 of the configuration data for the first biocide (B1) in table 87, a check is made to determine if the time of day is to be used to control the biocide application. To do so the program execution branches to step 144, where the day and time specified in data table entry 94 are compared to the current day and time stored in the microcomputer memory to determine whether to apply the first biocide. If so, the feed timer for the first biocide (B1) is initialized at step 146 with the value of the application interval from data table entry 95. The program execution then advances to step 138 where the third relay 79 is energized and the first lockout timer is started at step 140. Eventually the B1 feed timer will expire and step 142 will be executed to terminate the application of the first biocide. If it was not time to apply the first biocide at step 144, the program advances directly to step 138 without starting the feed timer.

The next section 150 of the one-second subroutine contains set of steps for controlling the application of the second biocide B2. The steps of this section 150 are identical to step 134–146 for the first biocide, except that they control the fourth relay 80 and use a separate volume set point and biocide application and lockout timers.

At the completion of section 150, the program execution advances to step 152 on FIG. 5C and enters a portion of the subroutine that determines whether a bleed-off should occur. The two lockout timers in the microcomputer 44 are tested to determine if both have expired at this time. As previously described, the application of conventional biocides raises the conductivity of the cooling tower water until the biocides distribute evenly through the water. A separate lockout timer is set during the application of each biocide (e.g. at step 140) to inhibit conductivity sensing until the biocide concentration reaches equilibrium. As the dispersion period for the two biocides may differ, separate lockout timers are used. If both lockout timers have not elapsed, the program makes sure drain valve 38 is shut at step 153 and then jumps around the steps that perform conductivity sensing and bleed-off to step 179.

Otherwise if conductivity sensing is not inhibited by a lockout timer, the microcomputer 44 determines whether a bleed-off already is taking place at step 154. This is accomplished by reading a flag that is set during a bleed-off. When a bleed-off is not taking place, the measured conductivity is compared at step 156 to the conductivity threshold limit stored in entry 89 of the configuration data table 87. For example, the conductivity threshold may be in the range of 1,000 micromhos. If the measured conductivity is below the limit a bleed-off is not required and the program execution jumps to step 179.

When the conductivity exceeds the specified limit, an output latch 72 is set to a high logic level at step 158 to energize the first relay 74 and open the drain valve 38. A bleed-off cycle timer within the microcomputer 44 is started by loading it with the user defined interval read from entry 90 of the configuration data table 87 at step 160. A counter of the number of bleed-off cycles which are required to reduce the conductivity of the water is reset to zero at step 162 before the program advances to step 179.

If a bleed-off already is in progress when step 154 is executed, the program branches to step 166 where the bleed-off cycle timer is checked. Should the timer have a non-zero value, indicating that the bleed-off interval has not elapsed, the measured water conductivity is examined at step 168. When the conductivity level drops below ninety-four percent of the threshold limit, the bleed-off terminates by de-energizing the first relay 74 at step 170. Although two different electrical conductivity thresholds are used to control when the bleed-off starts and stops, the two thresholds could have the same value.

At the expiration of the bleed-off cycle timer, program execution branches from step 166 to step 172 at which a count of the number of cycles of the present bleed-off process is incremented and stored in memory. The bleed-off cycle timer then is restarted at step 174 and the new count in the cycle counter is tested at step 175. When the count is less than ten, the program execution jumps to step 179. Otherwise step 176 is executed to stop any chemical application that is occurring. This is accomplished by resetting the output latches that control the second, third and fourth relays to de-energize those devices.

The user defines the length of the bleed-off interval for data table entry 90 so that less than ten cycles of such a length normally will reduce the conductivity sufficiently. Thus, if ten bleed-off intervals, or cycles, occur before the conductivity drops below ninety-four percent of the defined threshold, an indication is produced at step 177 that a malfunction of a component of the evaporative condenser system has occurred. More than ten bleed-off intervals may occur when the conductivity sensor 22 is fouled or a valve is stuck. The error indication is provided by the microprocessor 44 sending a message to the display 56 which informs the system operator of a fouled sensor. In addition, the microprocessor sets the output latch in group 72 which produces an active signal from the seventh opto-isolator 84 and illuminates LED 85 to indicate that a system error has occurred.

Even though the conductivity sensor may be fouled or defective, the bleed-off continues until the measured conductivity value drops below ninety-four percent of the threshold limit. The program execution loops through steps 176, 177 and 178 until this drop in conductivity occurs. Another step can be inserted in this loop to test a switch which the user can activate to force the program out of this loop, as could be done after the sensor has been cleaned or repaired. When the conductivity finally drops below ninety-four percent of the threshold limit, the first relay is de-energized to close drain valve 38 at step 170.

At step 179, the display 56 is updated by the microcomputer 44 sending the selected information via data bus 42. The one-second subroutine then terminates by returning to step 110 in the main control program in FIG. 4.

Then the counter which counts the one-second intervals is checked to determine if a five-second interval has elapsed at step 110. At five-second intervals, the program execution branches to step 111 where a subroutine depicted in the flowchart in FIGS. 6 is called. This subroutine commences execution at step 180 where the microcomputer 44 zeroes the one-second counter so that it can measure another five-second interval. Then at step 181 the microcomputer sends the present value of the conductivity measurement to the driver 50 for the 4–20 milliampere current loop output. The program execution advances to step 182 at which the microcomputer 44 reads the count from the internal counter circuit that receives the flow rate signal and then resets the count to zero. The microcomputer uses this count acquired during the five second sampling period together with the information about the flow meter 14 stored in section 98 of data table 87 at step 184 to calculate the incremental volume of water added to the cooling tower during the sampling period. At step 186, the measurement of the incremental volume of water is added to a memory location which holds the total volume of water introduced into the cooling tower since installation of the controller 40. Next the incremental volume is added to the contents of the corrosion inhibitor (CI) volume register, the first biocide (B1) volume register and the second biocide (B2) volume register in the microcomputer's internal memory. The sums are stored back into those registers at step 188. The contents of each of the three memory registers indicate the amount of make-up water that has been added since the last application of the corresponding chemical.

The incremental water volume also is added to a make-up volume register at step 190. Then at step 192 this latter register is examined to determine if a make-up output signal pulse should be sent by the fifth opto-isolator 82. An output pulse is sent from the fifth opto-isolator 82 every time a given amount of water has been added to the cooling tower as indicated by comparing the contents of the make-up volume register with the data specified in table entry 99 of the configuration data table 87. A pulse is sent at step 194 by setting the data latch in group 72 which is coupled to the fifth opto-isolator 82. The program execution delays at this step for the duration of the pulse and then resets the data latch. The make-up volume register then is cleared at step 196. The execution of the five-second subroutine terminates returning to the main control program at step 112.

Figure 4:
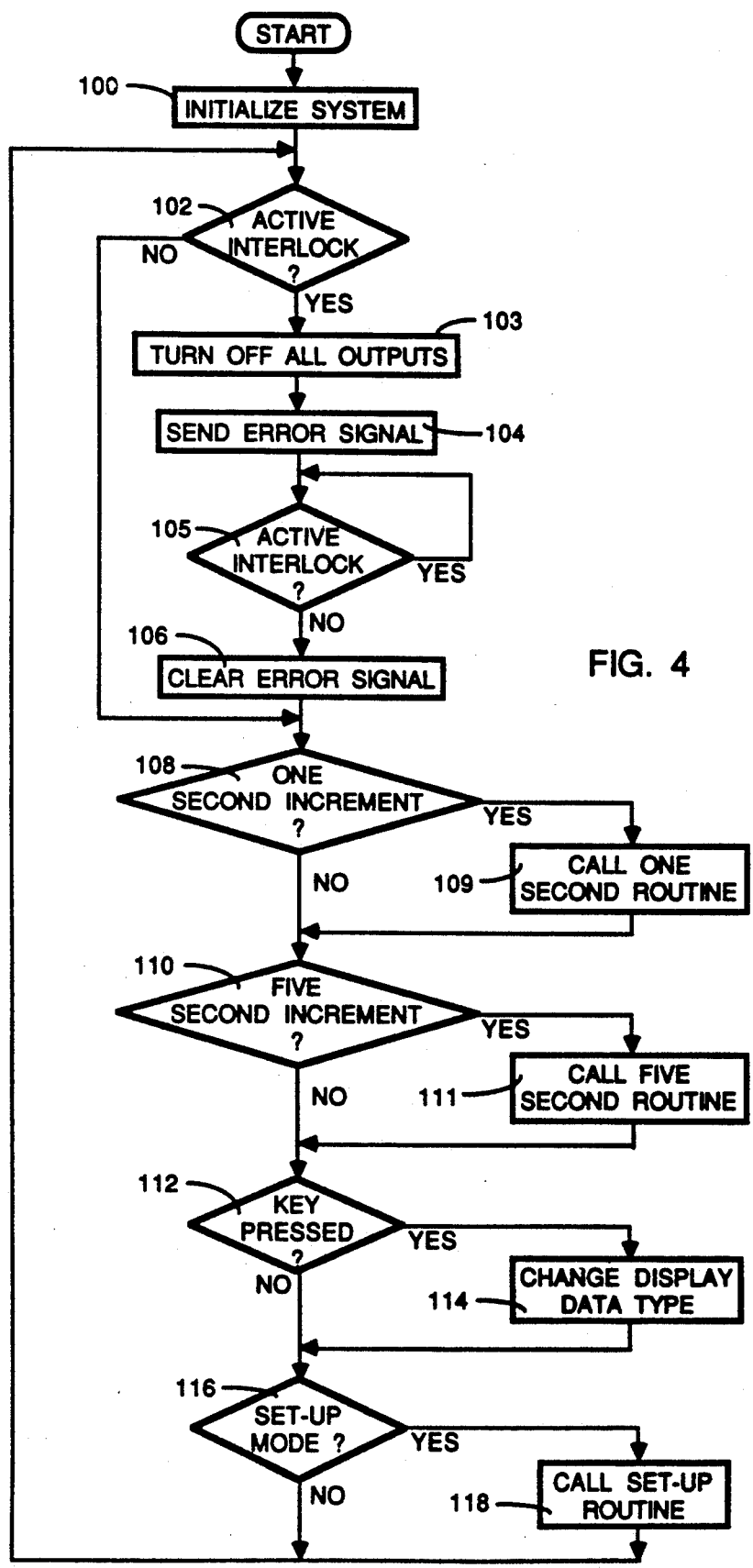
FIG. 4 is a flowchart of the program executed by the cooling tower controller.

At that point in the program shown in FIG. 4, the microcomputer inputs from the keypad 54 are tested to detect if a key is depressed by the operator at step 112. If so, a variable that indicates the type of data to be presented on display 56 is changed to the next type at step 114. In the run mode the keypad is used only to define the type of data displayed. For example, information regarding the relay states, time of day, water conductivity, total flow volume and sensor temperature alternatively can be displayed. The set-up switch 53 then is checked at step 116 to determine whether the system is to be placed in the set-up mode and if so, the program execution jumps to the set-up routine at step 118. The program execution then returns to step 102 to repeat the control loop.

We claim:

1. A water treatment controller, for an evaporative condenser system which includes a drain valve, a mechanism for replenishing water lost through evaporation and drainage and a chemical application device for adding at least one chemical to the water, said controller comprising:

means for sensing the conductivity of water in the evaporative condenser system;

valve control means, coupled to said means for sensing, for opening the drain valve when the conductivity is greater than a defined threshold level, and closing the drain valve when the conductivity is less than the defined threshold level;

means for measuring the volume of water that is added to the evaporative condenser system by the mechanism;

means for operating the chemical application device to add a first chemical to water in the evaporative condenser system in response to an indication received from said means for measuring that a first predefined volume of water has been added by the mechanism; and means for inhibiting said valve control means from opening the drain valve during a given period of time after the chemical has been added, which opening of the drain valve might otherwise occur from erroneous sensing of conductivity due to chemical addition.

2. The water treatment controller as recited in claim 1 wherein said means for operating causes the chemical application device to add a second chemical to water in the evaporative condenser system in response to said means for measuring indicating that a second predefined volume of water has been added to the evaporative condenser system.

3. The water treatment controller as recited in claim 2 wherein the first chemical is a biocide and the second chemical is a corrosion inhibitor.

4. The water treatment controller as recited in claim 1 wherein said means for operating causes the chemical application device to add a second chemical to water in the evaporative condenser system for a specified period of time at a predefined time of day.

5. The water treatment controller as recited in claim 1 wherein said means for operating is able to cause the chemical application device to add the first chemical to the water for a specified period of time whenever the predefined volume of water has been added by the mechanism for replenishing water.

6. The water treatment controller as recited in claim 1 wherein said valve control means closes the drain valve when the conductivity is at least a given amount less than the defined threshold level.

7. The water treatment controller as recited in claim 1 further comprising:
   means for measuring a period of time between when the conductivity exceeds the defined threshold level and when the conductivity drops a given amount below the defined threshold level; and
   means for indicating a possible malfunction of the evaporative condenser system when said means for measuring indicates that the period of time exceeds a defined interval.

8. An apparatus, for controlling the flow of a fluid through a system that has a drain valve and an inlet through which fluid is added to the system, said apparatus comprising:
   a sensor for detecting the conductivity of the fluid;
   means, coupled to said sensor, for opening the drain valve when the conductivity is greater than a first defined threshold level, and closing the drain valve when the conductivity is less than a second defined threshold level;
   means for indicating how long a period of time the drain valve is open; and
   means for signalling a possible malfunction of the system when said means for indicating indicates that the period of time the drain valve is opened exceeds a defined interval.

9. The apparatus as recited in claim 8 wherein:
   said means for opening the drain valve does so for fixed intervals of time, the duration of which are definable by a user of the apparatus;
   said means for indicating counts the fixed intervals that occur after the drain is opened until the conductivity is less than the second defined threshold level; and
   said means for signalling a possible malfunction responds when a count produced by said means for indicating reaches a given number.

10. The apparatus as recited in claim 8 wherein the second defined threshold level is substantially ninety-four percent of the first defined threshold level.

11. The apparatus as recited in claim 8 further comprising:
    means for measuring the volume of fluid that is added through the inlet; and
    a means for controlling a pump to apply a chemical to the fluid in the system in response to said means for measuring indicating that a predetermined volume of fluid has been added through the inlet.

12. The apparatus as recited in claim 11 further comprising means for inhibiting the drain valve being opened during a given period following an addition of a chemical.

13. An apparatus for chemically treating fluid flowing through a device that has a drain valve and an inlet through which fluid flows into the device, said apparatus comprising:
    means for sensing the conductivity of fluid in the device;
    valve control means, coupled to said means for sensing, for opening the drain valve when the conductivity is greater than a first threshold level, and closing the drain valve when the conductivity is less than a second threshold level;
    means for measuring the volume of fluid that flows through the inlet;
    means for controlling the addition of a first chemical to the fluid flowing through the device in response to an indication received from said means for measuring that a first predefined volume of fluid has flowed through the inlet;
    means for controlling the addition of a second chemical to the fluid flowing through the device either in response to an indication received from said means for measuring that a second predefined volume of fluid has flowed through the inlet, or at a first specified time of day, as selected by the user;
    means for controlling the addition of a third chemical to the fluid flowing through the device either in response to an indication received from said means for measuring that a third predefined volume of fluid has flowed through the inlet, or at a second specified time of day, as selected by the user; and
    means for inhibiting the drain valve from being opened during one defined period following addition of the second chemical and during another defined period following addition of the third chemical, which opening of the drain valve might otherwise occur from erroneous sensing of conductivity due to chemical addition.

14. The apparatus as recited in claim 13 further comprising:
    means for measuring a period of time between when the conductivity exceeds the first threshold level and when the conductivity drops a given amount below the second threshold level; and
    means for signalling the possibility of a malfunction when said means for measuring indicates that the period of time exceeds a defined interval.

* * * * *